US009334120B2

(12) United States Patent
    Cribiu

(10) Patent No.: US 9,334,120 B2
(45) Date of Patent: May 10, 2016

(54) ELEVATOR CONVEYOR BELT WITH ADJUSTABLE SLOPE

(71) Applicant: Luca Cribiu, Saronno (IT)

(72) Inventor: Luca Cribiu, Saronno (IT)

(73) Assignee: CRIZAF S.R.L., Saronno (VA) (IT)

( * ) Notice: Subject to any disclaimer, the term of this patent is extended or adjusted under 35 U.S.C. 154(b) by 0 days.

(21) Appl. No.: 14/508,059

(22) Filed: Oct. 7, 2014

(65) Prior Publication Data

US 2015/0101910 A1  Apr. 16, 2015

(30) Foreign Application Priority Data

Oct. 15, 2013  (IT) .............................. MI2013A1705

(51) Int. Cl.
    *B65G 15/26*  (2006.01)
    *B65G 21/10*  (2006.01)
    *B65G 23/44*  (2006.01)
    *B65G 41/00*  (2006.01)

(52) U.S. Cl.
    CPC ................ *B65G 15/26* (2013.01); *B65G 21/10* (2013.01); *B65G 23/44* (2013.01); *B65G 41/001* (2013.01)

(58) Field of Classification Search
    None
    See application file for complete search history.

(56) References Cited

U.S. PATENT DOCUMENTS

| 4,088,255 | A | * | 5/1978 | DeTorre | ................ C08B 33/033 |
| | | | | | 225/96.5 |
| 4,367,814 | A | * | 1/1983 | Young | .................... B65G 21/12 |
| | | | | | 198/301 |
| 5,090,550 | A | | 2/1992 | Axmann | |
| 7,472,785 | B2 | * | 1/2009 | Albright | .............. B65G 41/005 |
| | | | | | 198/369.2 |
| 2012/0160636 | A1 | * | 6/2012 | Windfeld | ............. B65G 41/005 |
| | | | | | 198/592 |

FOREIGN PATENT DOCUMENTS

EP  0 731 040 A1  9/1996
FR  2 956 103 A1  8/2011

OTHER PUBLICATIONS

IT Search Report, dated Jul. 2, 2014, from corresponding IT application.

* cited by examiner

*Primary Examiner* — Kavel Singh
(74) *Attorney, Agent, or Firm* — Young & Thompson

(57) ABSTRACT

An elevator conveyor belt (10) with adjustable slope, suitable for moving semi-finished or finished products on different levels along production lines, includes a supporting and stiffening frame (12) divided in at least two adjacent sections defined by a horizontal section (14) or load section arranged according to a horizontal plane and by an elevator section (16) arranged according to a sloped plane and a belt (28) tensioned between an opposed head end of the horizontal section (14) and a tail end of the elevator section (16) and slidably actuated by an electrical motor (25), the horizontal or load section (14) and the elevator section (16) being reciprocally hinged by a hinged connection (13) including mobile elements suitable for ensuring a constant tensioning of the belt (28) with the change of the reciprocal slope between the sections.

19 Claims, 6 Drawing Sheets

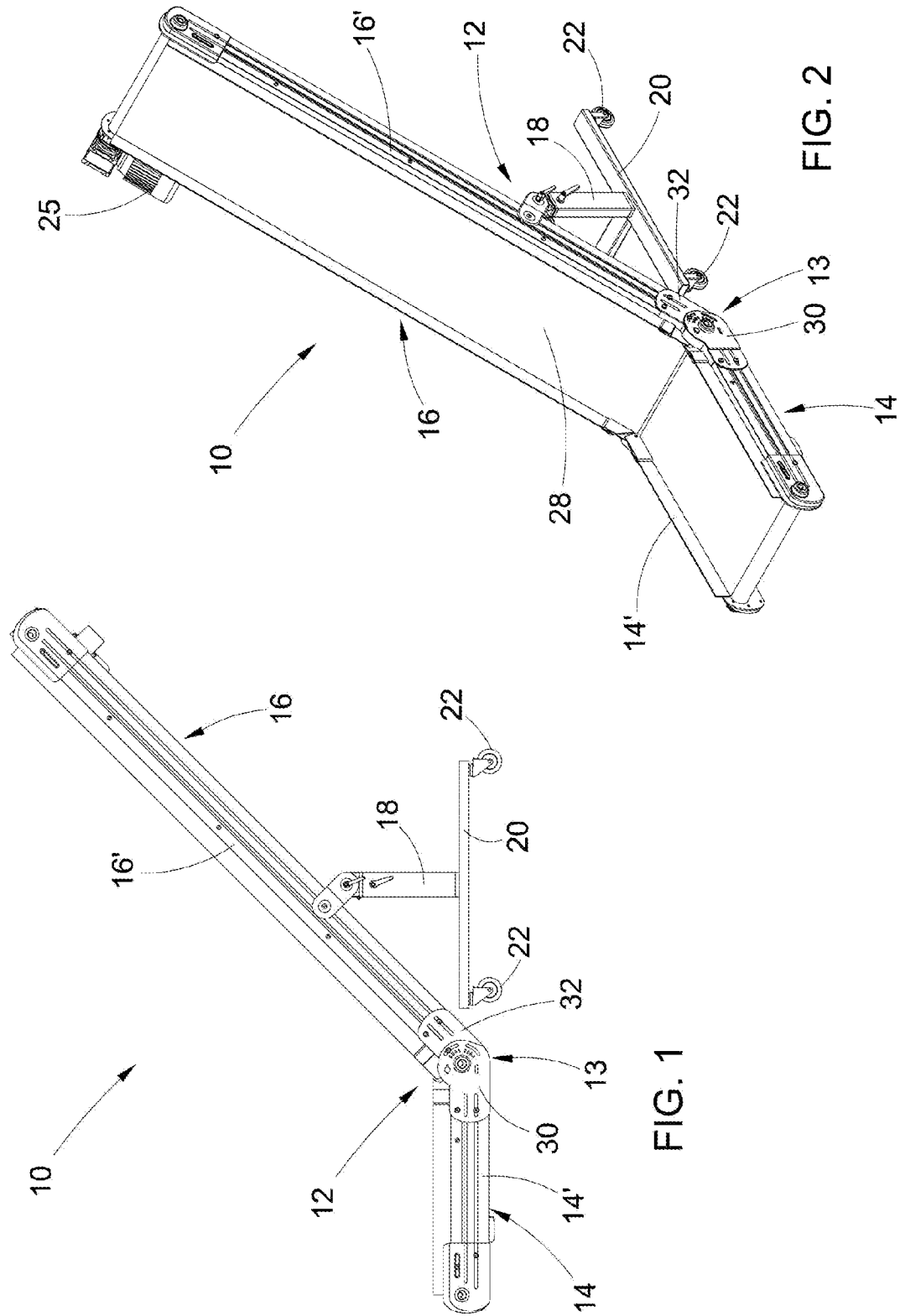

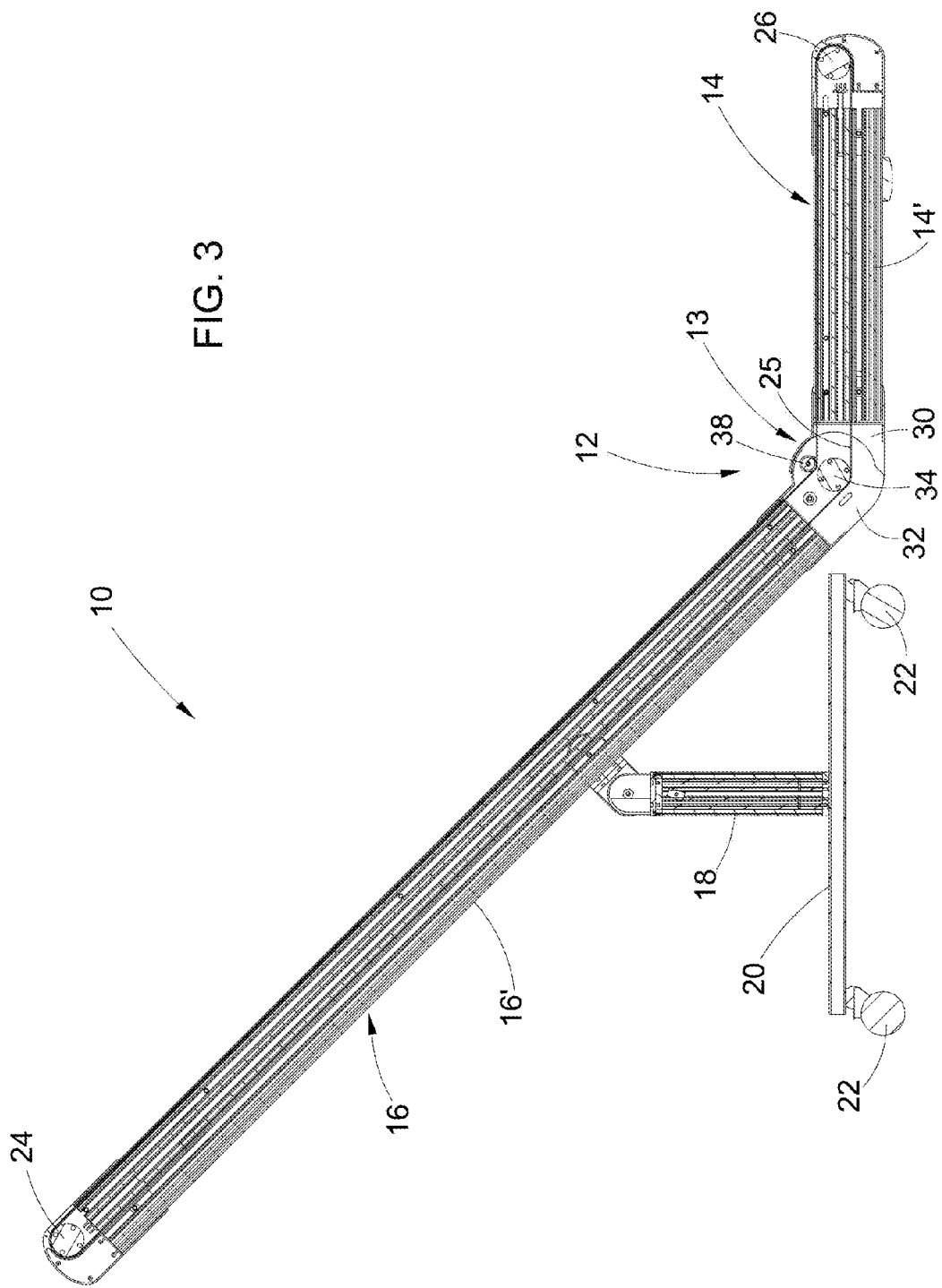

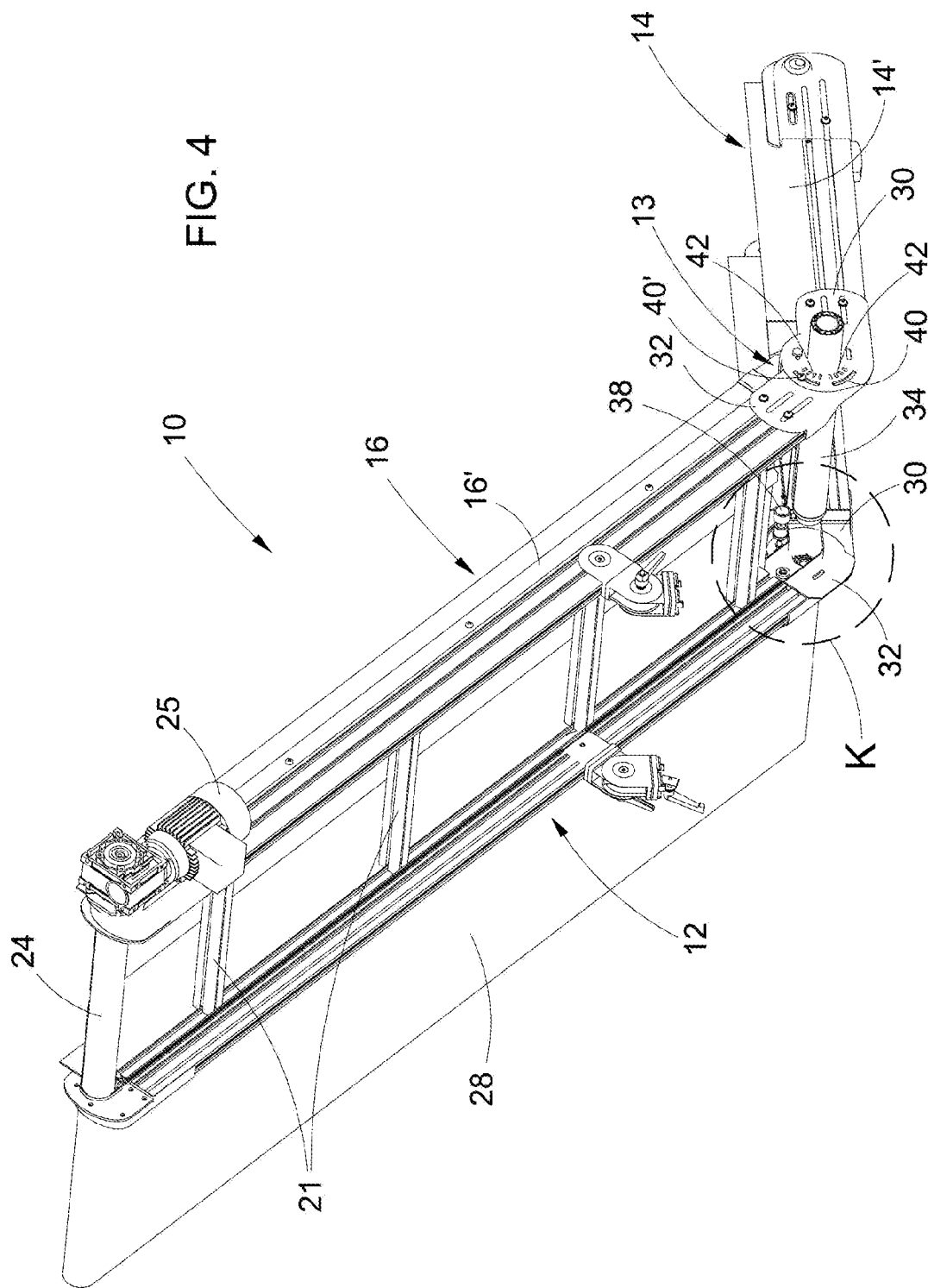

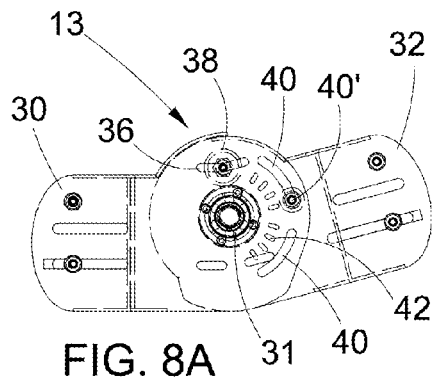 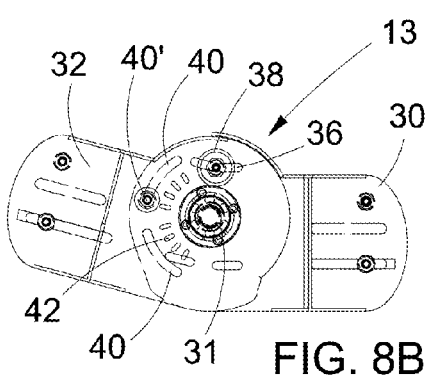
FIG. 8A  FIG. 8B
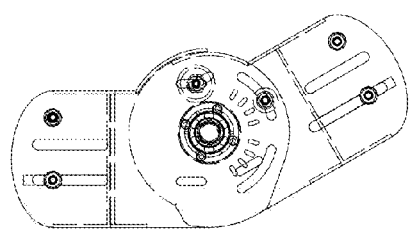 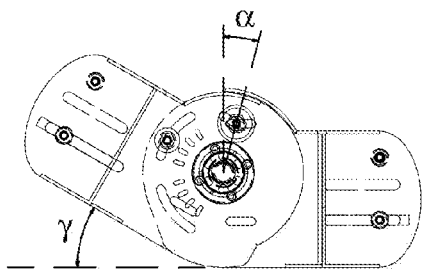
FIG. 9A  FIG. 9B
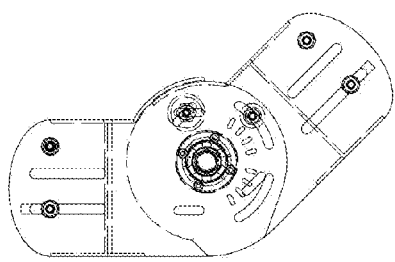 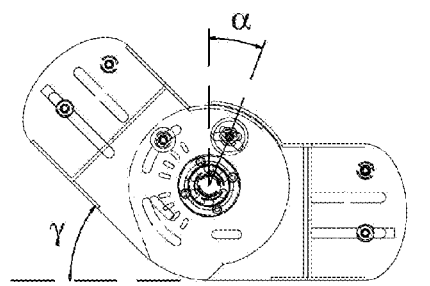
FIG. 10A  FIG. 10B
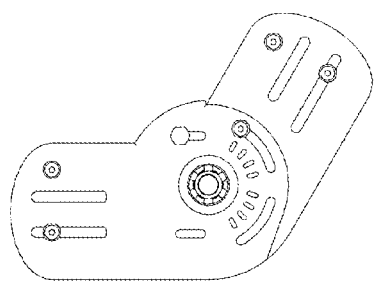 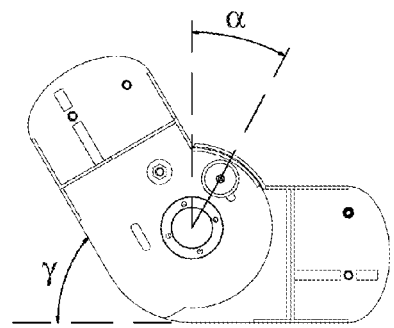
FIG. 11A  FIG. 11B

ELEVATOR CONVEYOR BELT WITH ADJUSTABLE SLOPE

FIELD OF THE INVENTION

The present invention relates to an elevator conveyor belt with adjustable slope.

More in particular, the present invention relates to an elevator conveyor belt for which it is possible to adjust the slope or inclination of a length or a portion of belt with respect to another adjacent length or portion.

BACKGROUND OF THE INVENTION

As it is known, conveyor belts are mechanical devices having the function of moving, continuously or from point to point, semi-finished or finished goods (arranged in bulk or in an orderly fashion) along production lines, for example to feed/load products in a production line, to transfer them from one workstation to the next, or to unload/store finished products.

Conveyor belts typically consist of a frame or metal structure comprising the support of the belt (the sliding surface or the supporting rollers), a drive pulley or roller (typically the head pulley) and a guide pulley or roller (typically the tail pulley) with idle rotation and a belt made of canvas or impregnated canvas or rubber or rubberized canvas, or a mesh made of plastic, steel or of another known and suitable material on which the products or semi-finished goods are placed and conveyed, in a more or less orderly fashion, during the production or storage cycle or the like.

Conveyor belts can have, according to the specific requirements for movement of the products or to the type of products to be moved or the layout of the system in which the conveyor belt is installed, a flat rectilinear development or can follow curvilinear paths or even have an inclined development.

In particular, the conveyor belt with inclined or sloping development is used in the case of transporting/conveying material from a lower to a higher level, or vice versa.

A conveyor belt with a structure of this type can consist of an integrated and rigid structure comprising, for example, two horizontal portions arranged on different levels, rigidly and stably connected to each other by means of an intermediate portion sloping with the inclination of the sloping portion calculated in the design stage as a function of the requirements.

However, this solution has some problems linked to the fact of having to accurately calculate the slope of the belt in the design stage and, moreover, does not allow re-use of the conveyor belt if different inclinations are required: in fact, this conveyor belt is made to measure for a specific system.

According to other conventional embodiments, the sloping conveyor belt structure can be of modular type with a sloping module arranged between belt modules positioned according to horizontal surfaces at different levels; for example, by varying the type of sloping intermediate module or the difference in level between the flat modules it is possible to reconfigure the system.

Although these solutions are advantageous with respect to those with fixed slope described previously, they still have some noteworthy problems linked to the fact that the single modules must each be provided with a proper motor, with consequent complications as regards control of the modules (in terms of conveyor belt speed) thus coupled and correct synchronism between them.

To solve these problems elevator conveyor belts have been developed in which the slope of the portion intermediate to the two horizontal portions can be changed using a lever mechanisms, devices of the rack and pinion type, idle and return rollers for the reciprocally sliding movement of plates.

One solution that solves the problems above is, for example, described in EP0731040, in which the conveyor belt comprises a supporting frame on which a sliding belt is wound, said frame comprising at least two portions hinged to one another for adjustment of the reciprocal angular position so as to go from a sloped configuration (with one ascending portion or one descending portion) to a configuration in which said two portions lie on a same horizontal plane and in which, to maintain the tension of the conveyor belt constant when the configuration is changed, one of the portions of the frame comprises, in correspondence of the unconstrained ends, a flange that slides longitudinally inside the frame suitable for changing the longitudinal distance between the ends of the conveyor belt and optionally provided with a preloaded spring for elastic return.

Another solution is described in the document FR2956103, in which adjustment of the angular position is implemented by means of a ramp provided with rollers or similar sliding means and arranged in correspondence of the hinge connection between the portions of the frame, with one end hinged with respect to a portion of frame and with the other opposite end sliding in a slot of the adjacent portion of frame, while adjustment of the tension of the conveyor belt when the relative angular position between said portions is changed is obtained by means of guide rollers on which the conveyor belt is tensioned and which move with respect to the longitudinal direction of advance of the same belt.

However, although these construction solutions effectively solve the problem linked to the change of the slope of the intermediate portion of the elevator and to control of the movement, they have some noteworthy problems linked to the complexity of their construction (for example, large number of components) and design and, consequently, to the resulting correlated costs.

A further drawback is linked to the fact that in these known conveyor belts with adjustable slope, while sliding along portions with different inclinations/slopes, the belt tends to form "bulges", i.e. local deformations of the belt, which can prevent correct and uniform sliding of the belt and, consequently, correct movement of the material on the same belt.

SUMMARY OF THE INVENTION

The object of the present invention is to solve the problems indicated above.

More in particular, the object of the present invention is to provide an elevator conveyor belt with adjustable slope, which is flexible and easily adaptable to different configurations of use.

A further object of the present invention is to provide an elevator conveyor belt for which adjustment of the slope of an elevator portion can be implemented in a simple and straightforward way and without the formation of undesirable "bulges".

Another object of the present invention is to provide an elevator conveyor belt that has a simple construction and structure.

A further object of the present invention is provide users with a conveyor belt with adjustable slope suitable for ensuring a high level of resistance and reliability in time and also such as to be easily and inexpensively produced.

These and other objects are achieved by the device according to the invention having the characteristics claimed in claim 1.

According to the invention there is provided an elevator conveyor belt with adjustable slope, suitable for moving semi-finished or finished products on different levels along production lines, comprising a supporting and stiffening frame divided in at least two adjacent sections defined by a horizontal section or load section arranged according to an horizontal plane and by an elevator section arranged according to an inclined plane and a belt tensioned between an opposed head end of the horizontal section and a tail end of the elevator section and slidably actuated by means of an electrical motor, the horizontal or load section and the elevator section are reciprocally hinged by means of a hinged connection comprising mobile means suitable for ensuring a constant tensioning of the belt with the change of the reciprocal slope between said sections.

Advantageous embodiments of the invention will be apparent from the dependent claims.

BRIEF DESCRIPTION OF THE DRAWINGS

The functional and constructional characteristics of the elevator conveyor belt with adjustable slope of the present invention will be better understood from the detailed description below, in which reference is made to the accompanying drawings, which represent a preferred but non-limiting embodiment thereof and wherein:

FIG. 1 schematically represents a side view of an elevator conveyor belt with adjustable slope of the present invention;

FIG. 2 schematically represents an axonometric view of the elevator conveyor belt of the present invention;

FIG. 3 represents a schematic sectional view according to a vertical plane of the elevator conveyor belt of FIG. 1;

FIG. 4 schematically represents a perspective view from below of the elevator conveyor belt of the invention, partly exploded to show the internal components;

FIGS. 8A and 8B, 9A and 9B, 10A and 10B, 11A and 11B, represent, according to a front and back side view, different angular configurations of an element for adjusting the slope of the conveyor belt of the invention.

DETAILED DESCRIPTION OF THE INVENTION

Figure 5:
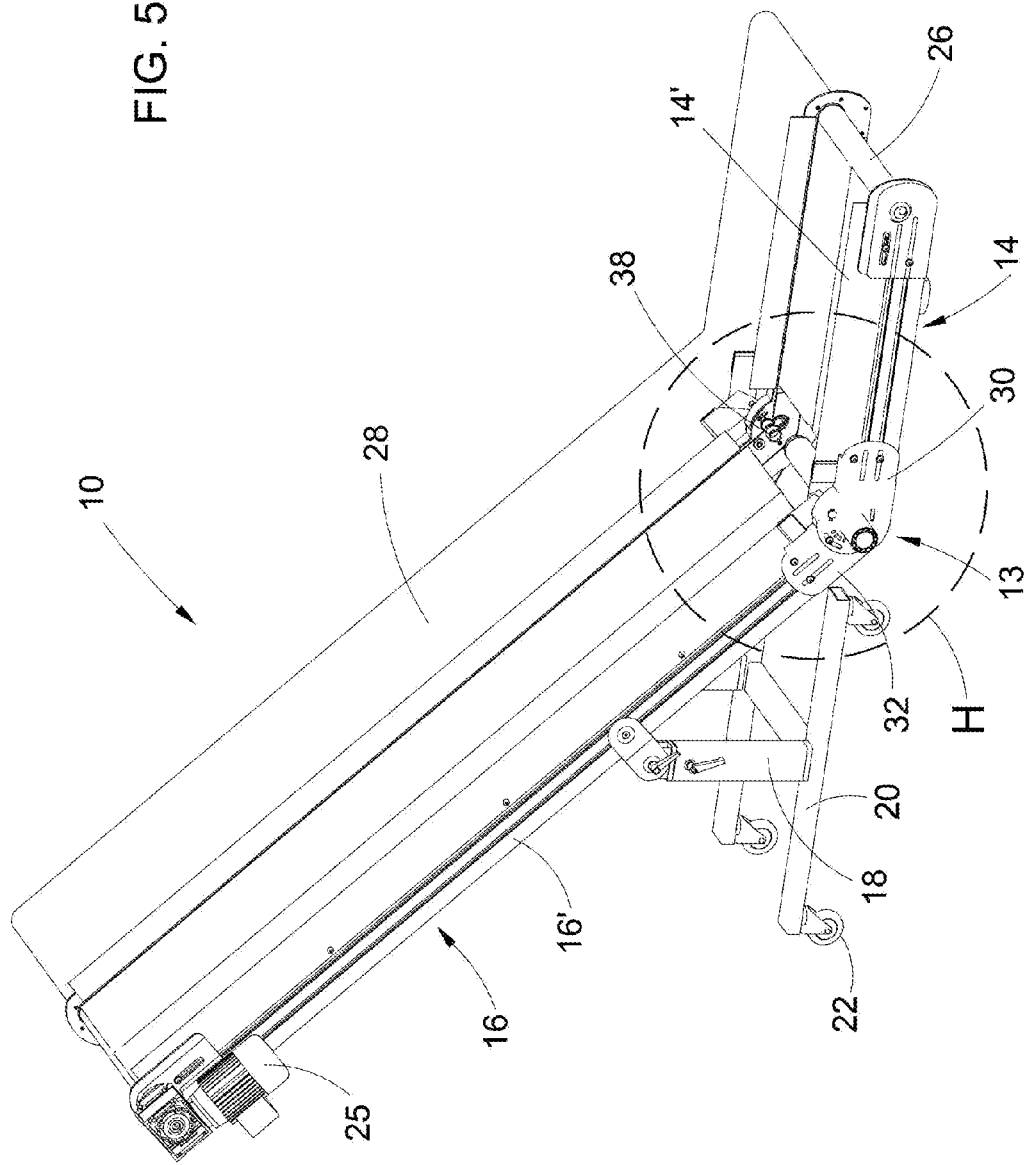
FIG. 5 represents a partly exploded schematic axonometric view from above of the conveyor belt.
Figure 7:
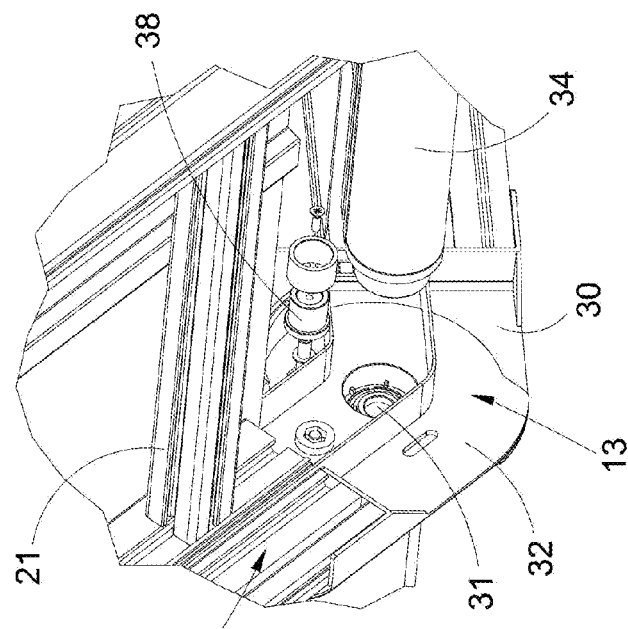
FIGS. 6 and 7 schematically represent two enlarged details, respectively of FIG. 5 (detail H) and of FIG. 4 (detail K)
Figure 6:
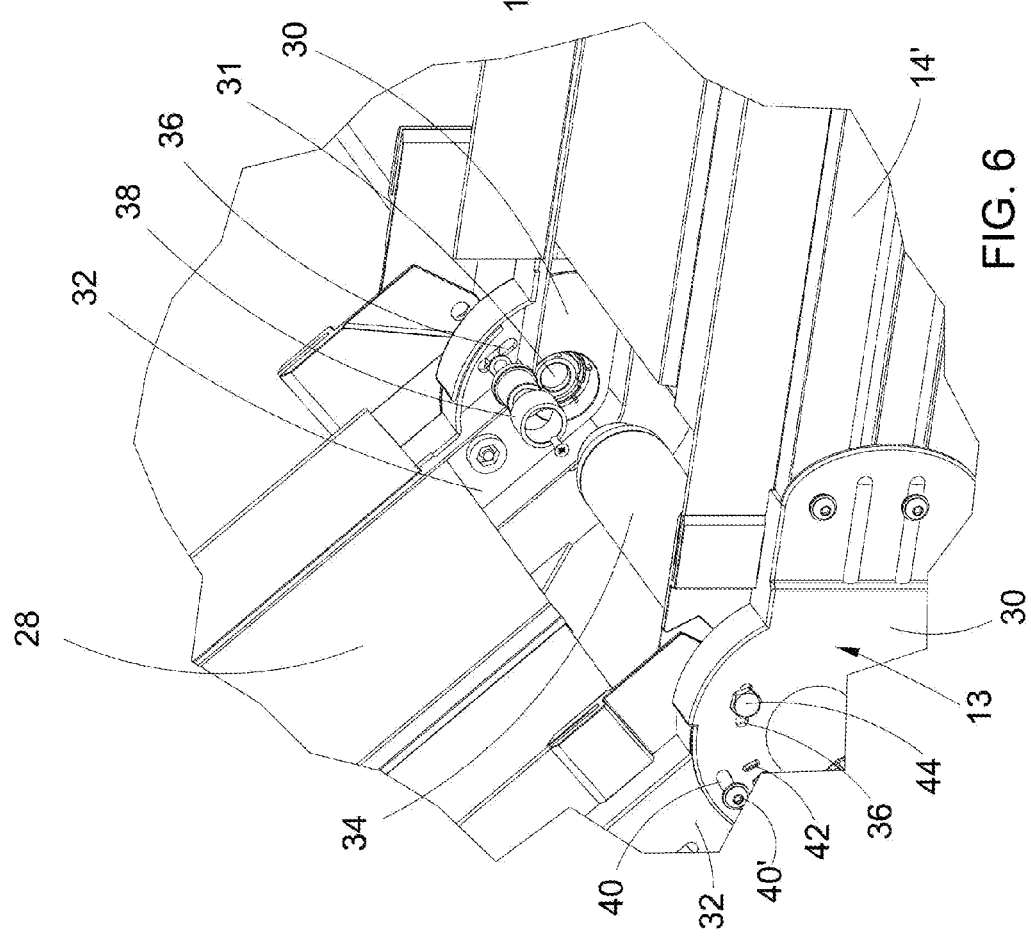

With reference to the aforesaid figures, the elevator conveyor belt with adjustable slope of the present invention, indicated as a whole with 10, comprises a typically metal structure defined by a frame 12 that, in the preferred embodiment according to the figures, comprises at least two adjacent sections 14 and 16, reciprocally constrained by means of a hinged connection 13 according to the methods described below and arranged according to a horizontal plane (horizontal section 14 or load section) and according to a sloped plane (elevator section 16).

The frame of the horizontal section 14 or load section comprises two opposed shoulders 14' while the elevator section 16 comprises two opposed shoulders 16', with said opposed shoulders 14' and 16' stiffened by means of transverse elements 21.

The frame 12 must be appropriately sized as a function of the material (semi-finished or finished products, or the like) moved and, consequently, of the loads and of the static and dynamic stresses to which the conveyor belt is subjected during operation thereof.

Moreover, said frame 12 is fixed stably to the ground by means of a fixed base and uprights, optionally adjustable in height or, as schematized in the figures, by means of uprights 18 (adjustable in height) fixed to a base 20 movable by means of wheels 22 or equivalent means.

Said frame has the function of containing and stiffening the structure of the conveyor belt.

With reference to the figures and considering the horizontal section 14 or load section as head element and the elevator section as tail element, the frame 12 comprises a motor pulley 24 fixed rotatably to the elevator section 26 in correspondence of its tail end and a guide pulley 26 fixed rotatably to the horizontal section 14 in correspondence of the head end thereof; said motor pulley 24 and guide pulley 26 being arranged between the opposed shoulders 14' and 16' of the two sections 14 and 16 and crosswise thereto.

The motor pulley 24 is rotated by means of an electrical motor 25 (optionally provided with a reduction unit) while the guide pulley 26 is an idle pulley, so as to determine the sliding movement of a belt 28 wound and tensioned on these pulleys.

Moreover, the frame 12 can comprise elements, for example defined by idle rotating transverse rollers or by plate-like elements, placed to support sliding of the belt 28 so as to substantially define a sliding surface suitable for ensuring improved stability of the products transported by the same belt.

As introduced above, the horizontal section 14 or load section and the elevator section 16 are reciprocally constrained by means of a hinged connection 13 that comprises two opposed horizontal plates 30 fixed in correspondence of the tail end of the horizontal section 14 or loading section and two opposed elevator plates 32 fixed in correspondence of the head end of the elevator section 16, with said opposed plates 30 and 32 fixed to the shoulders of the frames of the respective horizontal and elevator sections by means of retaining means of screw or similar type.

The opposed horizontal plates 30 and the opposed elevator plates 32 are coupled to each other (with the opposed elevator plates 32 arranged internally to the opposed horizontal plates 30) in correspondence of the end portions opposite to those of fixing with respect to the opposed shoulders of the frame 12 of the two sections to define a fulcrum point or hinge that comprises a coaxial pair of opposed bearings 31 (typically although not exclusively ball bearings) that support the idle rotation of a support roller 34 arranged transversely to the opposed pairs of plates 30 and 32; said support roller 34 is arranged inferiorly to the belt 28 and, as defined above, produces a support for sliding of said belt.

The opposed plates 30 and 32 comprise slots 36 with rectilinear development that intersect one another appropriately to define the position of two opposed return rollers 38 facing the inner part of the plates 30 and 32 and in the direction of the belt 28 and with axis arranged parallel to and above the axis of the support roller 34; the return roller 38 is in contact with the upper surface of the belt 28 slidable in intermediate position between said return rollers 38 and said support roller 34.

The coupled opposed horizontal plates 30 and the elevator plates 32 comprise further slots 40, with rectilinear development, provided with a graduated scale 42 (formed on the outer face of the plates visible to an operator) for the function described in more detail below, transversely and internally to which is arranged a retaining element defined by a clamping screw 40' having the function of rigidly fixing the pairs of opposed plates and preventing movements of relative rotation between the same.

The longitudinal development of the slots 36 and of the further slots 40 is calculated to enable a change of the slope of the elevator section 16 with respect to the horizontal section 14 or load section in an angular interval γ (calculated with reference to a horizontal surface) generally between 15° and 60°, as schematized in FIGS. 8A to 11B.

The method of adjusting the slope of the conveyor belt described in detail above with reference to the constructional characteristics is detailed below.

In the case in which a change of the slope of the elevator section 16 is required, an operator loosens the clamping screws 40' and any stop elements 46 of the uprights 18 of the frame 12 that block the change in height of said uprights 18 and, by means of the graduated scale 42, accurately adjusts the slope of the elevator section 16 with respect to the horizontal section 14 or load section to the desired angular value, with the return roller 38 and the clamping screws 40' and which slide with respect to the slots 36 and to the further slots 40, as schematized in FIGS. 8A to 11B.

After reaching the required angular position, the clamping screw 40' of the opposed plates 30 and 32 and the stop elements 46 of the uprights 18 of the frame 12 are clamped so as to prevent all relative rotation movements between the horizontal section or load section 14 and the elevator section 16.

In particular, during the step of adjusting the slope of the elevator section 16, the angular position of the return roller 38 varies along a rectilinear trajectory (determined by the shape of the slots 36) with angular amplitude defined by an angle α, calculated with reference to the vertical drawn from the center of the bearing 31 and equal to the bisector of the angle γ; in this way, it is possible to maintain constant tensioning of the belt 28 with the change of the slope of the elevator section 16 with respect to the horizontal or load section 14.

As can be understood from the above, the advantages achieved by the conveyor belt of the invention are evident.

Due to the hinge connection described, the elevator conveyor belt with adjustable slope of the present invention advantageously enables rapid, easy and precise change of the slope of the conveyor belt, so as to adapt the conveyor belt to different layout configurations.

A further advantage is represented by the fact that the opposed return rollers 38, by changing their position during adjustment of the slope of the elevator section along a rectilinear line, ensure constant tensioning of the belt 28, avoiding the formation of "bulges", without the need to tighten or loosen the same with accessory means with the change of slope.

Another advantage is represented by the support roller 34 that, being arranged coaxially to the hinge defined by the opposed plates 30 and 32, enables the number of components of the conveyor belt to be reduced and the construction thereof to be simplified.

A further advantage is the fact that the conveyor belt of the invention has a modular structure that enables expansion of the structure described with reference to the main embodiment shown in the figures by adding further horizontal and/or sloping sections in series.

Although not illustrated in the accompanying drawings, on the belt 28 there are normally provided, as a function of the type of product transported, transverse strips suitable for supporting the production during transfer.

While the invention has been described above with particular reference to an embodiment thereof provided purely by way of non-limiting example, numerous modifications and variants of the description above will be apparent to those skilled in the art. Therefore, the present invention is intended to include all the modifications and variants that fall within the scope of the appended claims.

The invention claimed is:

1. An elevator conveyor belt (10) with adjustable slope, suitable for moving semi-finished or finished products on different levels along production lines, comprising:
    a supporting and stiffening frame (12) comprised of at least two adjacent sections defined by i) a horizontal load section (14) arranged according to a horizontal plane and ii) an elevator section (16) arranged according to an inclined plane, the horizontal load section (14) having a free head end and an opposite tail end, the elevator section (16) having a head end and an opposite free tail end;
    a belt (28) tensioned between the head end of the horizontal load section (14) and the tail end of the elevator section (16);
    an electric motor (25) that slidably actuates the belt (28);
    an idle roller (26) at the free head end of the horizontal load section (14), the idle roller (26) in contact with the a lower surface of the belt (28);
    a hinged connection (13) placed between the tail end of the horizontal load section (14) and the head end of the elevator section (16) and connecting the tail end of the horizontal load section (14) to the head end of the elevator section (16),
    wherein the horizontal load section (14) and the elevator section (16) are reciprocally hinged by the hinged connection (13) and the hinged connection (13) allows a change of a reciprocal slope between the horizontal load section (14) and the elevator section (16) from i) an initial, first reciprocal slope to ii) a different, second reciprocal slope;
    said hinge connection (13) comprising a pair of opposed return rollers (38) located between the horizontal load section (14) and the elevator section (16), the opposed return rollers (38) maintaining a constant tensioning of the belt (28) with the change of the reciprocal slope between the horizontal load section (14) and the elevator section (16) from the initial, first reciprocal slope to the different, second reciprocal slope, and
    wherein the pair of opposed return rollers (38) are transversely arranged to said hinge connection (13), facing an inner part of the hinge connection (13) in a direction of the belt (28) and in contact with a surface of said belt (28).

2. The conveyor belt according to claim 1, wherein the hinge connection (13) comprises i) two opposed horizontal plates (30) fixed in correspondence of the tail end of the horizontal load section (14) and ii) two opposed elevator plates (32) fixed in correspondence of the head end of the elevator section (16).

3. The conveyor belt according to claim 2,
    further comprising a coaxial pair of opposed bearings (31), and a support roller (34),
    wherein, the opposed horizontal plates (30) and the opposed elevator plates (32) are coupled to each other, with the opposed elevator plates (32) arranged internally to the opposed horizontal plates (30), in correspondence of end portions opposite to those of fixing with respect to the horizontal load section (14) and the elevator section (16) to define a fulcrum point that accommodates the coaxial pair of opposed bearings (31) supporting idle rotation of the support roller (34) transversely arranged with respect to, and extending between, said opposed horizontal plates (30) and the opposed elevator plates (32).

4. The conveyor belt according to claim 3, wherein the opposed return rollers (38) are transversely arranged to the opposed horizontal plates (30) and the opposed elevator plates (32) and facing an inner part of the opposed horizontal plates (30) and the opposed elevator plates (32).

5. The conveyor belt according to claim 4, wherein an axis of the opposed return rollers (38) is arranged parallel and above an axis of the support roller (34).

6. The conveyor belt according to claim 5, wherein the opposed return rollers (38) are in contact with an upper surface of the belt (28) slidable in an intermediate position between said return rollers (38) and the support roller (34).

7. The conveyor belt according to claim 4, wherein the opposed horizontal plates (30) and the opposed elevator plates (32) comprise slots (36) with rectilinear development internally to which the return rollers (38) are movable along a trajectory with angular amplitude defined by an angle α, calculated with reference to a vertical drawn from a center of the bearing (31) and equal to a bisector of an angle γ indicative of a slope of the elevator section (16) with respect to the horizontal load section (14).

8. The conveyor belt according to claim 3, wherein the opposed horizontal plates (30) and the opposed elevator plates (32) comprise further slots (40) provided with a graduated scale (42) formed on the outer face of said opposed horizontal plates (30) and the opposed elevator plates (32) and internally to which is arranged a retaining element defined by a clamping screw (40') suitable for rigidly fixing the opposed horizontal plates (30) and the opposed elevator plates (32).

9. The conveyor belt according to claim 1, wherein the horizontal load section (14) and the elevator section (16) define modules suitable for an expansion/reconfiguration of the conveyor belt.

10. A method for adjusting the slope of said elevator conveyor belt according to claim 8, comprising the steps of:
   a. loosening the clamping screws (40');
   b. adjusting the slope of the elevator section (16) using the graduated scale (42) in an angular range γ between 15° and 60°; and
   c. tightening the clamping screws (40').

11. An elevator conveyor belt (10) with adjustable slope, suitable for moving semi-finished or finished products on different levels along production lines, comprising:
   a supporting and stiffening frame (12) comprised of i) a horizontal load section (14) arranged along a horizontal plane and ii) an elevator section (16) arranged at an inclined plane,
   the horizontal load section (14) having a head end and an opposite tail end,
   the elevator section (16) having a head end and an opposite tail end;
   a belt (28) tensioned between the head end of the horizontal load section (14) and the tail end of the elevator section (16);
   an idle roller (26) at the free head end of the horizontal load section (14), the idle roller (26) in contact with the a lower surface of the belt (28);
   an electric motor (25) that actuates the belt (28);
   a hinged connection (13) between the tail end of the horizontal load section (14) and the head end of the elevator section (16), the hinged connection (13) connecting the tail end of the horizontal load section (14) to the head end of the elevator section (16),
   wherein the hinge connection (13) comprises i) two opposed horizontal plates (30) fixed to the tail end of the horizontal load section (14) and ii) two opposed elevator plates (32) fixed to the head end of the elevator section (16),
   the two opposed horizontal plates (30) fixed in to the tail end of the horizontal load section (14), and
   the opposed elevator plates (32) fixed to the head end of the elevator section (16),
   wherein the horizontal load section (14) and the elevator section (16) are reciprocally hinged by the hinged connection (13) with the hinged connection (13) allowing a change of a reciprocal slope between the horizontal load section (14) and the elevator section (16) from i) an initial, first reciprocal slope to ii) at least a different, second reciprocal slope;
   a pair of opposed return rollers (38) that maintain a constant tensioning of the belt (28) with the change of the reciprocal slope between the horizontal load section (14) and the elevator section (16) from the initial, first reciprocal slope to the different, second reciprocal slope,
   wherein said pair of opposed return rollers (38) is located between the horizontal load section (14) and the elevator section (16) transversely arranged to said hinge connection (13), facing an inner part of the hinge connection (13) in a direction of the belt (28) and in contact with a surface of said belt (28);
   a coaxial pair of opposed bearings (31); and
   a support roller (34) transversely arranged with respect to, and extending between, said opposed horizontal plates (30) and the opposed elevator plates (32),
   wherein, the opposed horizontal plates (30) and the opposed elevator plates (32) are coupled to each other, with the opposed elevator plates (32) arranged internally to the opposed horizontal plates (30), in correspondence of end portions opposite to end portions of fixing with respect to the horizontal load section (14) and the elevator section (16) to define a fulcrum point that accommodates the coaxial pair of opposed bearings (31) supporting idle rotation of the support roller (34).

12. The conveyor belt according to claim 11, wherein the opposed return rollers (38) are transversely arranged to the opposed horizontal plates (30) and the opposed elevator plates (32) and facing an inner part of the opposed horizontal plates (30) and the opposed elevator plates (32).

13. The conveyor belt according to claim 12, wherein an axis of the opposed return rollers (38) is arranged parallel and above an axis of the support roller (34).

14. The conveyor belt according to claim 13, wherein the opposed return rollers (38) are in contact with an upper surface of the belt (28) slidable in an intermediate position between said return rollers (38) and the support roller (34).

15. The conveyor belt according to claim 13, wherein the opposed horizontal plates (30) and the opposed elevator plates (32) comprise slots (36) with rectilinear development internally to which the return rollers (38) are movable along a trajectory with angular amplitude defined by an angle α, calculated with reference to a vertical drawn from a center of the bearing (31) and equal to a bisector of an angle α indicative of a slope of the elevator section (16) with respect to the horizontal load section (14).

16. The conveyor belt according to claim 11, wherein the opposed horizontal plates (30) and the opposed elevator plates (32) comprise further slots (40) provided with a graduated scale (42) formed on the outer face of said opposed horizontal plates (30) and the opposed elevator plates (32) and internally to which is arranged a retaining element defined by a clamping screw (40') suitable for rigidly fixing the opposed horizontal plates (30) and the opposed elevator plates (32).

17. The conveyor belt according to claim 11, wherein the horizontal load section (14) and the elevator section (16) define modules suitable for an expansion/reconfiguration of the conveyor belt.

18. A method for adjusting the slope of said elevator conveyor belt according to claim 16, comprising the steps of:
   a. loosening the clamping screws (40');
   b. adjusting the slope of the elevator section (16) using the graduated scale (42) in an angular range α between 15° and 60°; and
   c. tightening the clamping screws (40').

19. An elevator conveyor belt (10) with adjustable slope, suitable for moving semi-finished or finished products on different levels along production lines, comprising:
   a supporting and stiffening frame (12) comprised of i) a horizontal load section (14) arranged along a horizontal plane and ii) an elevator section (16) arranged at an inclined plane, the horizontal load section (14) having a free head end and an opposite tail end,
   the elevator section (16) having a head end and an opposite free tail end;
   a belt (28) tensioned between the free head end of the horizontal load section (14) and the free tail end of the elevator section (16);
   an idle roller (26) at the free head end of the horizontal load section (14), the idle roller (26) in contact with the a lower surface of the belt (28);
   an electric motor (25) connected to actuate the belt (28) at the free tail end of the elevator section (16);
   a hinged connection (13) comprising i) two opposed horizontal plates (30) fixed to the tail end of the horizontal load section (14) and ii) opposed elevator plates (32) fixed to the head end of the elevator section (16), the hinged connection (13) connecting the tail end of the horizontal load section (14) to the head end of the elevator section (16) with the horizontal load section (14) and the elevator section (16) reciprocally hinged by the hinged connection (13),
   wherein the hinged connection (13) allows a change of a reciprocal slope between the horizontal load section (14) and the elevator section (16) from i) an initial, first reciprocal slope to ii) at least a different, second reciprocal slope;
   a pair of opposed return rollers (38) that maintain a constant tensioning of the belt (28) with the change of the reciprocal slope between the horizontal load section (14) and the elevator section (16) from the initial, first reciprocal slope to the different, second reciprocal slope,
   wherein said pair of opposed return rollers (38) is located between the horizontal load section (14) and the elevator section (16) transversely arranged to said hinge connection (13), facing an inner part of the hinge connection (13) in a direction of the belt (28) and in contact with a surface of said belt (28);
   a coaxial pair of opposed bearings (31), and
   a support roller (34) transversely extending between i) a first of the opposed horizontal plates (30) and a first of the opposed elevator plates (32) and ii) a second of the opposed horizontal plates (30) and a second of the opposed elevator plates (32),
   wherein, the opposed horizontal plates (30) and the opposed elevator plates (32) are coupled to each other, with the opposed elevator plates (32) arranged internally to the opposed horizontal plates (30), in correspondence of end portions opposite to end portions of fixing with respect to the horizontal load section (14) and the elevator section (16) to define a fulcrum point that accommodates the coaxial pair of opposed bearings (31) supporting rotation of the support roller (34).

\* \* \* \* \*